(12) United States Patent
Roundy et al.

(10) Patent No.: US 10,055,586 B1
(45) Date of Patent: *Aug. 21, 2018

(54) SYSTEMS AND METHODS FOR DETERMINING THE TRUSTWORTHINESS OF FILES WITHIN ORGANIZATIONS

(71) Applicant: Symantec Corporation, Mountain View, CA (US)

(72) Inventors: Kevin Roundy, El Segundo, CA (US); Sandeep Bhatkar, Sunnyvale, CA (US); Christopher Gates, Culver City, CA (US); Anand Kashyap, Los Altos, CA (US); Yin Liu, Sunnyvale, CA (US); Aleatha Parker-Wood, Palo Alto, CA (US); Leylya Yumer, Antibes (FR)

(73) Assignee: Symantec Corporation, Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/753,051

(22) Filed: Jun. 29, 2015

(51) Int. Cl.
*G06F 11/00* (2006.01)
*G06F 12/14* (2006.01)
(Continued)

(52) U.S. Cl.
CPC ............ *G06F 21/57* (2013.01); *H04L 63/101* (2013.01); *H04L 63/1441* (2013.01);
(Continued)

(58) Field of Classification Search
CPC ........ G06F 21/00; G06F 21/56; G06F 21/562; G06F 21/57; G06F 21/554; G06F 21/53; G06F 11/00; G06F 12/14; G06F 12/16; H04L 63/1416; H04L 63/1433; H04L 63/145; G08B 23/00

See application file for complete search history.

(56) References Cited

U.S. PATENT DOCUMENTS

| 7,352,280 B1 | 4/2008 | Rockwood |
| 8,214,905 B1 * | 7/2012 | Doukhvalov ......... G06F 21/577 726/24 |

(Continued)

OTHER PUBLICATIONS

Kevin Alejandro Roundy; Systems and Methods for Estimating Confidence Scores of Unverified Signatures; U.S. Appl. No. 14/307,477, filed Jun. 18, 2014.

(Continued)

*Primary Examiner* — Jayesh M Jhaveri
(74) *Attorney, Agent, or Firm* — FisherBroyles, LLP

(57) ABSTRACT

The disclosed computer-implemented method for determining the trustworthiness of files within organizations may include (1) identifying a file on a computing device within multiple computing devices managed by an organization, (2) in response to identifying the file, identifying at least one additional computing device within the multiple computing devices that is potentially associated with the file, (3) distributing at least a portion of the file to a user of the additional computing device with a request to receive an indication of the trustworthiness of the file, and then (4) receiving, from the additional computing device, a response that indicates the trustworthiness of the file. Various other methods, systems, and computer-readable media are also disclosed.

20 Claims, 7 Drawing Sheets

(51) Int. Cl.
*G06F 12/16* (2006.01)
*G08B 23/00* (2006.01)
*G06F 21/57* (2013.01)
*H04L 29/06* (2006.01)
*G06F 21/56* (2013.01)
*G06F 21/00* (2013.01)
*G06F 21/55* (2013.01)
*G06F 21/53* (2013.01)

(52) U.S. Cl.
CPC .............. *G06F 21/00* (2013.01); *G06F 21/53* (2013.01); *G06F 21/554* (2013.01); *G06F 21/56* (2013.01); *G06F 21/562* (2013.01); *G06F 2221/034* (2013.01); *H04L 63/145* (2013.01); *H04L 63/1416* (2013.01); *H04L 63/1433* (2013.01)

(56) References Cited

U.S. PATENT DOCUMENTS

| | | | |
|---|---|---|---|
| 8,839,435 | B1 | 9/2014 | King |
| 9,098,706 | B1 | 8/2015 | Kennedy |
| 9,270,467 | B1 | 2/2016 | Chen et al. |
| 9,413,780 | B1* | 8/2016 | Kaplan ............... H04L 63/1433 |
| 9,485,272 | B1 | 11/2016 | Roundy |
| 9,792,169 | B2 | 10/2017 | Seigel |
| 9,838,405 | B1 | 12/2017 | Guo et al. |
| 2002/0083070 | A1 | 6/2002 | Shuster |
| 2005/0283837 | A1 | 12/2005 | Olivier et al. |
| 2006/0230451 | A1 | 10/2006 | Kramer et al. |
| 2006/0242712 | A1 | 10/2006 | Linn et al. |
| 2006/0253548 | A1 | 11/2006 | Vitanov et al. |
| 2007/0240217 | A1 | 10/2007 | Tuvell et al. |
| 2008/0086772 | A1 | 4/2008 | Chesla |
| 2009/0089290 | A1 | 4/2009 | Nachenberg et al. |
| 2009/0217370 | A1 | 8/2009 | Hulten et al. |
| 2010/0083376 | A1* | 4/2010 | Pereira ................. G06F 21/562 726/22 |
| 2010/0186088 | A1* | 7/2010 | Banerjee ................ G06F 21/51 726/23 |
| 2010/0228852 | A1 | 9/2010 | Gemelos et al. |
| 2012/0233698 | A1 | 9/2012 | Watters et al. |
| 2013/0074143 | A1 | 3/2013 | Bu et al. |
| 2013/0298242 | A1* | 11/2013 | Kumar .................... G06F 21/52 726/25 |
| 2014/0013434 | A1* | 1/2014 | Ranum ................ H04L 63/145 726/24 |
| 2014/0096246 | A1 | 4/2014 | Morrissey et al. |
| 2014/0223566 | A1 | 8/2014 | Zaitsev |
| 2014/0283065 | A1* | 9/2014 | Teddy .................. H04L 63/145 726/23 |
| 2014/0283066 | A1 | 9/2014 | Teddy et al. |
| 2015/0074806 | A1 | 3/2015 | Roundy et al. |
| 2015/0128263 | A1 | 5/2015 | Raugas et al. |
| 2015/0207813 | A1 | 7/2015 | Reybok et al. |
| 2015/0372976 | A1 | 12/2015 | Lonas et al. |
| 2016/0072836 | A1 | 3/2016 | Hadden et al. |
| 2016/0080400 | A1 | 3/2016 | Sim et al. |
| 2016/0292419 | A1 | 10/2016 | Langton et al. |

OTHER PUBLICATIONS

Kuang, Liwei (Vivian), "DNIDS: A Dependable Network Intrusion Detection System Using the CSI-KNN Algorithm", https://qspace.library.queensu.ca/bitstream/1974/671/2/Kuang_Liwei_200709_MSc.pdf, as accessed Apr. 25, 2014, A thesis submitted to the School of Computing in conformity with the requirements for the degree of Master of Science, Queen's University, Kingston, Ontario, Canada, (Sep. 2007).

Yu, Dong et al., "Alert Confidence Fusion in Intrusion Detection Systems with Extended Dempster-Shafer Theory", http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014, 43rd ACM Southeast Conference, Kennesaw, GA, USA, (Mar. 18-20, 2005).

"ArcSight", http://www8.hp.com/us/en/software-solutions/arcsight-express-siem-appliance/tech-specs.html?jumpid=reg_r1002_usen_c-001_title_r0002, as accessed Apr. 25, 2014, Hewlett-Packard Development Company, L.P., (2014).

Fanglu Guo, et al.; Systems and Methods for Determining Types of Malware Infections on Computing Devices; U.S. Appl. No. 14/947,878, filed Nov. 20, 2015.

"Managed Security Services", http://www.symantec.com/managed-security-services/, as accessed Sep. 21, 2015, Symantec Corporation, (On or before Sep. 21, 2015).

"Naive Bayes classifier", https://en.wikipedia.org/wiki/Naive_Bayes_classifier, as accessed Sep. 21, 2015, Wikipedia, (Jan. 31, 2005).

"Probabilistic classification", https://en.wikipedia.org/wiki/Probabilistic_classification, as accessed Sep. 21, 2015, Wikipedia, (Aug. 7, 2014).

Lord, Nate, "Common Malware Types: Cybersecurity 101", https://www.veracode.com/blog/2012/10/common-malware-types-cybersecurity-101, as accessed Sep. 21, 2015, VERACODE, (Oct. 12, 2012).

Kevin Alejandro Roundy, et al.; Systems and Methods for Detecting Security Threats; U.S. Appl. No. 15/084,522, filed Mar. 30, 2016.

"Association rule learning", https://en.wikipedia.org/wiki/Association_rule_learning, as accessed Mar. 2, 2016, Wikipedia, (Apr. 15, 2005).

Kevin Roundy, et al.; Systems and Methods for Identifying Non-Malicious Files on Computing Devices Within Organizations; U.S. Appl. No. 14/750,342, filed Jun. 25, 2015.

"Stack Overflow", http://stackoverflow.com/, as accessed May 13, 2015, Stack Exchange Inc, (Mar. 1, 2000).

"Yelp", http://www.yelp.com/, as accessed May 13, 2015, (Nov. 28, 1996).

Chris Gates, et al; Systems and Methods for Detecting Security Blind Spots; U.S. Appl. No. 15/266,320, filed Sep. 15, 2016.

Chris Gates et al.; Systems and Methods for Personalizing Security Incident Reports; U.S. Appl. No. 15/292,874, filed Oct. 13, 2016.

Suleiman Yerima et al., A New Android Malware Detection Approach Using Baysian Classification, IEEE, 2013.

ArcSight; http://www8.hp.com/us/en/software-solutions/arcsight-express-siem-appliance/tech-specs.html?jumpid=reg_r1002_usen_c-001_title_r0002, as accessed Apr. 25, 2014; Hewlett-Packard Development Company, L.P., 2004.

Kevin Alejandro Roundy, et al; Systems and Methods for Detecting Security Threats; U.S. Appl. No. 15/084,522, filed Mar. 30, 2016.

\* cited by examiner

Request
210

File1.exe was identified on the computing device of User1. Analyze File1.exe in a virtual execution environment and determine the trustworthiness of File1.exe.

Response
212

Indication of Trustworthiness: Trustworthy

Justification: File1.exe does not exhibit any unusual or suspicious behaviors.

Allowed Permissions: Install Drivers
Launch Processes
Access Networks

*FIG. 5*

SYSTEMS AND METHODS FOR DETERMINING THE TRUSTWORTHINESS OF FILES WITHIN ORGANIZATIONS

BACKGROUND

Organizations often deploy a variety of anti-malware and/or file-filtering technologies in order to prevent potentially malicious files from infecting or being installed on computing devices within the organizations. In one example, an organization may compile a blacklist that identifies malicious and/or untrusted files. In the event that a user within the organization attempts to access an untrusted file, an anti-malware program on the user's computing device may block or prevent the user from downloading and/or installing the file in response to identifying the file on the blacklist. In another example, an organization may compile a whitelist that identifies files allowed to be accessed within the organization.

Unfortunately, traditional methods for creating whitelists and blacklists may be inefficient, inconvenient, and/or unable to accurately determine whether a file is trusted or untrusted. For example, a conventional whitelisting technology may rely on receiving approval of files from specified managers and/or Information Technology (IT) administrators within an organization. In organizations that handle large numbers of new files, managers or administrators may be overburdened and unable to keep up with approving or denying each file requested by users within the organizations. As a result, individuals within an organization may be blocked from accessing legitimate, harmless, and/or important files (e.g., files created by members of the organization that are not recognized by traditional anti-malware programs). In addition, users within organizations may choose to disable anti-malware programs in the event that the programs are too disruptive and/or unreliable. Therefore, the instant disclosure identifies and addresses a need for improved systems and methods for determining the trustworthiness of files within organizations.

SUMMARY

As will be described in greater detail below, the instant disclosure describes various systems and methods for determining the trustworthiness of files within organizations by prompting multiple users within an organization to manually evaluate the trustworthiness of a file. The systems and methods described herein may then allow or block the file within the organization based on evaluations of the file by the users within the organization.

In one example, a computer-implemented method for determining the trustworthiness of files within organizations may include (1) identifying a file on a computing device within multiple computing devices managed by an organization, (2) in response to identifying the file, identifying at least one additional computing device within the multiple computing devices that is potentially associated with the file, (3) distributing at least a portion of the file to a user of the additional computing device with a request to receive an indication of the trustworthiness of the file, and then (4) receiving, from the additional computing device, a response that indicates the trustworthiness of the file. In some embodiments, the method may further include providing, to the user of the additional computing device, a virtual execution environment in which to analyze the file.

In some examples, identifying the file on the computing device may include detecting an attempt by a user of the computing device to install and/or download the file onto the computing device. Additionally or alternatively, identifying the file on the computing device may include detecting an attempt by a user of the computing device to execute the file on the computing device.

In some embodiments, identifying the additional computing device that is potentially associated with the file may include identifying at least one characteristic of a user of the computing device. The method may then include identifying a computing device of an additional user within the organization that has the characteristic.

In some examples, distributing the portion of the file to the user of the additional computing device may include distributing information about a source of the file. Additionally or alternatively, distributing the portion of the file may include distributing information about behaviors exhibited by the file.

In some embodiments, after receiving the response from the user of the additional computing device, the method may further include determining that the user of the additional computing device is a trusted reviewer. In some examples, determining that the user of the additional computing device is the trusted reviewer may include (1) receiving, from the user of the additional computing device, a justification of the indication of the trustworthiness of the file, (2) displaying the justification of the indication of the trustworthiness of the file to multiple users within the organization, and then (3) determining that at least a certain number of users within the organization indicate that the justification is trusted. Additionally or alternatively, determining that the user of the additional computing device is the trusted reviewer may include determining that the user of the additional computing device has correctly indicated the trustworthiness of at least a certain number of files identified on the computing devices within the organization.

In some embodiments, the method may further include providing at least one reward to the user of the additional computing device in response to determining that the user of the additional computing device is the trusted reviewer. In some examples, providing the reward to the user of the additional computing device may include, when identifying an additional file on the additional computing device, allowing the user of the additional computing device to access the additional file before receiving an indication that the additional file is trustworthy from a user of another computing device within the organization.

In some examples, the method may further include distributing, to the user of the additional computing device, a request to identify permissions that should be granted to the file when the file is executed by the computing devices within the organization. The method may then include receiving, from the additional computing device, at least one allowed permission in response to the request. Next, the method may include preventing the file from being granted permissions other than the allowed permission when the file is executed by the computing devices within the organization.

In some embodiments, the method may further include determining that the response from the additional computing device indicates that the file is trustworthy. In such embodiments, the method may include adding the file to a whitelist that identifies files allowed to be accessed by the computing devices within the organization. In other embodiments, the method may include determining that the response from the additional computing device indicates that the file is untrustworthy. In such embodiments, the method may include adding the file to a blacklist that identifies files not allowed to be accessed by the computing devices within the organization.

In one embodiment, a system for implementing the above-described method may include (1) an identification module that (a) identifies a file on a computing device within multiple computing devices managed by an organization and (b) in response to identifying the file, identifies at least one additional computing device within the multiple computing devices that is potentially associated with the file, (2) a distribution module that distributes at least a portion of the file to a user of the additional computing device with a request to receive an indication of the trustworthiness of the file, and (3) a reception module that receives, from the additional computing device, a response that indicates the trustworthiness of the file. In addition, the system may include at least one physical processor configured to execute the identification module, the distribution module, and the reception module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file on a computing device within multiple computing devices managed by an organization, (2) in response to identifying the file, identify at least one additional computing device within the multiple computing devices that is potentially associated with the file, (3) distribute at least a portion of the file to a user of the additional computing device with a request to receive an indication of the trustworthiness of the file, and then (4) receive, from the additional computing device, a response that indicates the trustworthiness of the file Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary request sent to a computing device to determine the trustworthiness of a file and an exemplary response sent from a computing device that indicates the trustworthiness of a file.

Figure 1:
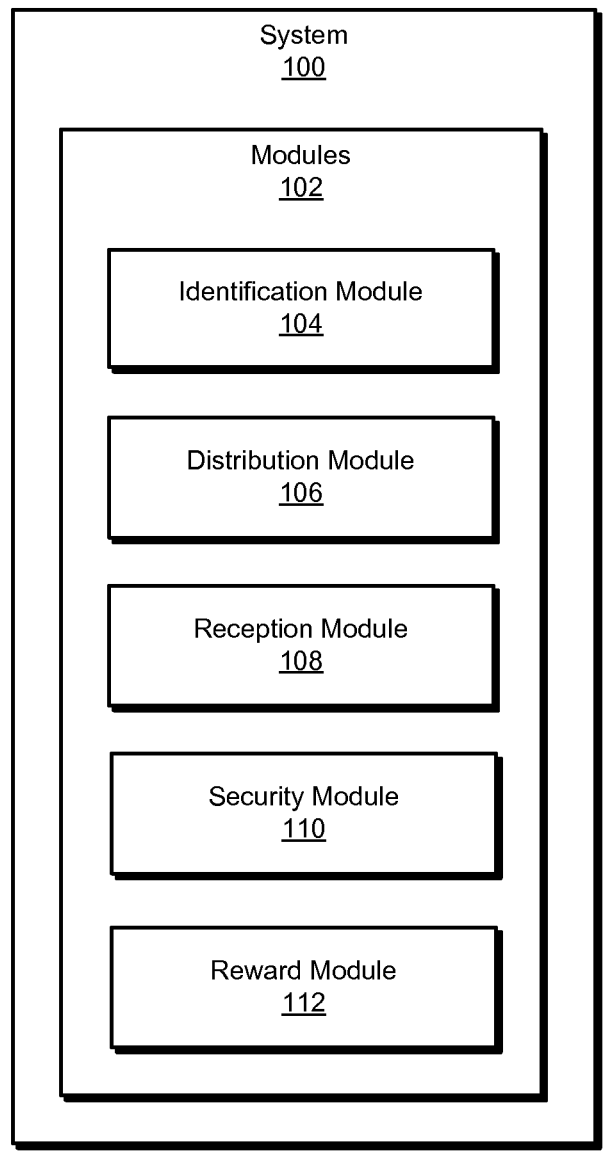
FIG. 1 is a block diagram of an exemplary system for determining the trustworthiness of files within organizations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining the trustworthiness of files within organizations. As will be explained in greater detail below, by prompting multiple users within an organization to analyze the trustworthiness of files before the files are allowed to be accessed within the organization, the systems and methods described herein may crowd-source reviews of files to reduce the burden of IT administrators having to approve or deny each incoming file. Furthermore, by selecting members of an organization that may be more qualified to review a file (e.g., users that may have the technical knowledge to properly analyze a file), the disclosed systems and methods may obtain fast and accurate indications of the trustworthiness of a file. As such, the systems and methods described herein may efficiently build whitelists and/or blacklists to ensure that only legitimate and/or secure files are accessed within an organization.

Figure 2:
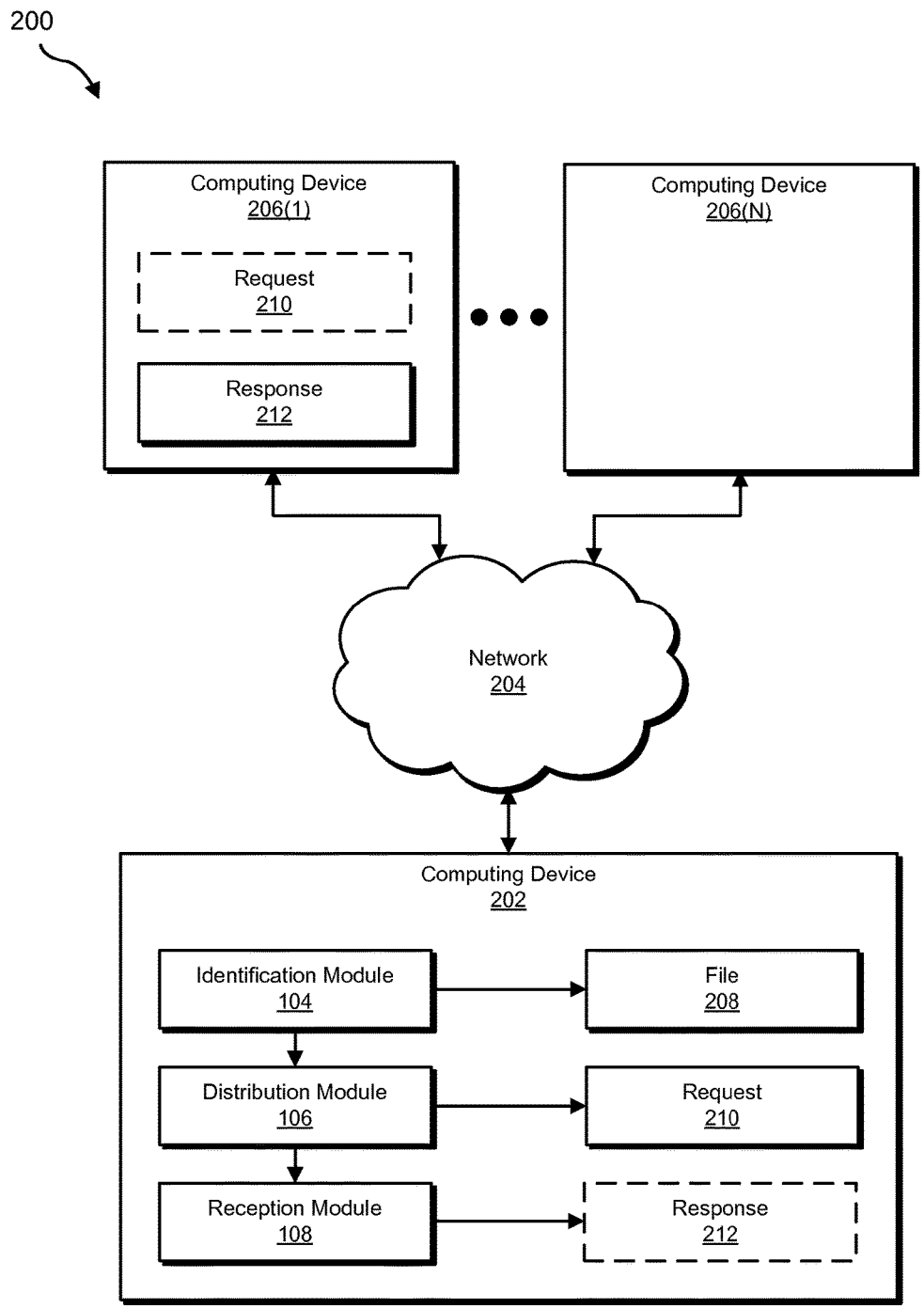
FIG. 2 is a block diagram of an additional exemplary system for determining the trustworthiness of files within organizations.

The following will provide, with reference to FIGS. 1 and 2, detailed descriptions of exemplary systems for determining the trustworthiness of files within organizations. Detailed descriptions of corresponding computer-implemented methods will also be provided in connection with FIG. 3. In addition, detailed descriptions of computing devices managed by an organization will be provided in connection with FIG. 4. Detailed descriptions of requests sent to computing devices to determine the trustworthiness of files and responses sent from computing devices that indicate the trustworthiness of files will also be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for determining the trustworthiness of files within organizations. As illustrated in this figure, exemplary system 100 may include one or more modules 102 for performing one or more tasks. For example, and as will be explained in greater detail below, exemplary system 100 may include an identification module 104 that (1) identifies a file on a computing device within multiple computing devices managed by an organization and (2) in response to identifying the file, identifies at least one computing device within the multiple computing devices managed by the organization that is potentially associated with the file. Exemplary system 100 may also include a distribution module 106 that distributes at least a portion of the file to a user of the additional computing device with a request to receive an indication of the trustworthiness of the file.

In addition, and as will be described in greater detail below, exemplary system 100 may include a reception module 108 that receives, from the additional computing device, a response that indicates the trustworthiness of the file. Exemplary system 100 may also include a security module 110 that performs one or more security actions based on the response from the additional computing device. Finally, exemplary system 100 may include a reward module 112 that provides at least one reward to the user of the additional computing device in response to determining that the user of the additional computing device is a trusted reviewer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing devices 206(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with computing devices 206(1)-(N) via a network 204. In the example of FIG. 2, computing device 202 may be programmed with one or more of modules 102. Additionally or alternatively, computing devices 206(1)-(N) may be programmed with one or more of modules 102.

In one embodiment, one or more of modules 102 from FIG. 1 may, when executed by at least one processor of computing device 202, enable computing device 202 to determine the trustworthiness of files within organizations. For example, and as will be described in greater detail below, identification module 104 may cause computing device 202 to identify a file (e.g., file 208) on at least one computing device (e.g., computing device 202) within multiple computing devices (e.g., computing device 202 and computing devices 206(1)-(N)) managed by an organization. In addition, identification module 104 may cause computing device 202 to, in response to identifying file 208, identify at least one computing device within computing devices 206(1)-(N) (e.g., computing device 206(1)) that is potentially associated with file 208. Next, distribution module 106 may cause computing device 202 to distribute at least a portion of file 208 to a user of computing device 206(1) with a request (e.g., request 210) to receive an indication of the trustworthiness of file 208. Finally, reception module 108 may cause computing device 202 to receive, from computing device 206(1), a response (e.g., response 212) that indicates the trustworthiness of file 208.

Computing device 202 and computing devices 206(1)-(N) generally represent any type or form of computing devices capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

In some embodiments, computing device 202 and computing devices 206(1)-(N) may represent computing devices managed by a single organization. The term "organization," as used herein, generally refers to any group or set of individuals that share any type or form of association or connection. Examples of organizations include, without limitation, businesses, enterprises, companies, schools, non-profit organizations, clubs, teams, members of online forums, individuals who subscribe to certain online services, combinations or one or more of the same, variations of one or more of the same, and/or any additional type of organization.

In one example, computing device 202 and/or computing devices 206(1)-(N) may represent personal computing devices assigned to and/or managed by individual members of an organization. Additionally or alternatively, one or more of computing device 202 and computing devices 206(1)-(N) may represent servers and/or databases configured to store and/or analyze files identified within an organization. In an exemplary embodiment, at least a portion of the systems described herein may be installed on each of computing device 202 and computing devices 206(1)-(N) as part of an organization-wide anti-malware program. For example, all or a portion of computing device 202 and computing devices 206(1)-(N) may be configured with identification module 104 in order to detect each file accessed by the computing devices. A central server or database, in communication with computing device 202 and computing devices 206(1)-(N), may host distribution module 106 and/or reception module 108 in order to facilitate crowd-sourcing reviews of the trustworthiness of each file identified by computing device 202 and/or computing devices 206(1)-(N).

Network 204 generally represents any medium or architecture capable of facilitating communication or data transfer. In some embodiments, computing devices 202 and/or computing devices 206(1)-(N) may be in communication with one another via network 204. In one example, network 204 may represent a private and/or local network configured by an organization that manages computing device 202 and computing devices 206(1)-(N). Additionally or alternatively, network 204 may provide computing devices 202 and/or computing devices 206(1)-(N) access to online services and networks external to the organization. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections.

Figure 3:
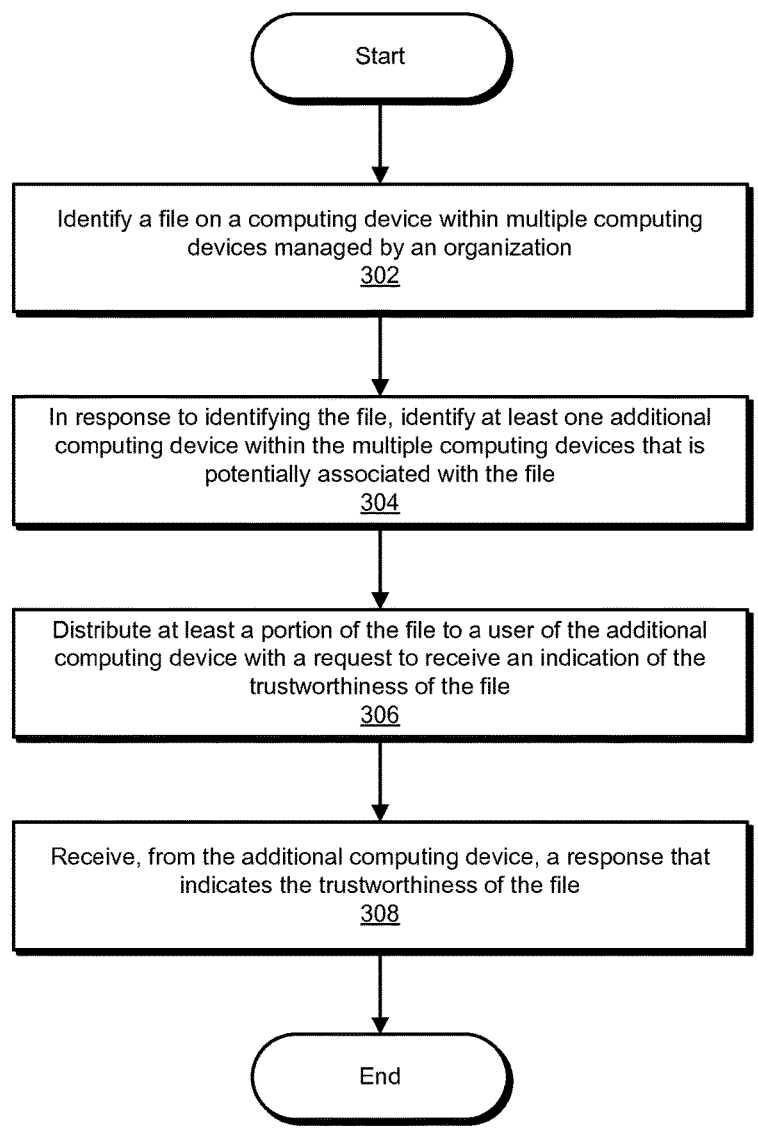
FIG. 3 is a flow diagram of an exemplary method for determining the trustworthiness of files within organizations.

FIG. 3 is a flow diagram of an exemplary computer-implemented method 300 for determining the trustworthiness of files within organizations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a file on at least one computing device within multiple computing devices managed by an organization. For example, identification module 104 may, as part of computing device 202 in FIG. 2, identify file 208 on computing device 202.

The term "file," as used herein, generally refers to any type or form of formatted portion of data or executable code. Examples of files include, without limitation, text files, image files, executable files, audiovisual files, compressed files, data files, database files, combinations of one or more of the same, variations of one or more of the same, and/or any additional type of file.

The systems described herein may identify a file on a computing device in a variety of ways. In some examples, identification module 104 may identify file 208 while monitoring computing device 202 for any indication that computing device 202 is accessing a new and/or unfamiliar file. For example, identification module 104 may detect all or a portion of the attempts made by a user of computing device 202 to install, download, upload, transfer, store, save, and/or execute files on computing device 202. In these examples, identification module 104 may identify file 208 on computing device 202 before file 208 has an opportunity to alter the configuration of computing device 202. In this way, the systems described herein may verify the trustworthiness of file 208 before file 208 is able to potentially compromise the safety and/or security of computing device 202.

In other examples, identification module 104 may identify file 208 after file 208 has been installed, downloaded, and/or executed on computing device 202. In these examples, identification module 104 may identify file 208 while analyzing existing files on computing device 202. For example, identification module 104 may periodically (e.g., every week, every month, etc.) examine the files on computing device 202 (as well as files on computing devices 206(1)-(N)) for any indication that the existing files may be malicious.

Returning to FIG. 3, at step 304 one or more of the systems described herein may, in response to identifying the file, identify at least one additional computing device within the multiple computing devices managed by the organization that is potentially associated with the file. For example, in response to identifying file 208, identification module 104 may, as part of computing device 202, identify at least one of computing devices 206(1)-(N) that is potentially associated with file 208.

The systems described herein may identify a computing device that is potentially associated with a file in a variety of ways. In some examples, identification module 104 may identify the computing device of any user within the organization that manages computing device 202 that may be able to accurately determine the trustworthiness of file 208. For example, identification module 104 may identify the computing devices of any users within the organization that share one or more characteristics with the user of computing device 202. Specifically, identification module 104 may identify a department or division to which the user of computing device 202 belongs and then identify members of the same department or division. In another example, identification module 104 may identify all or a portion of the computing devices within the organization that have previously accessed files similar to file 208 and/or that have a similar software or hardware configuration as computing device 202.

In some embodiments, identification module 104 may identify relevant users by identifying users who are known to be trusted reviewers (e.g., users whose judgement about the trustworthiness of files is presumed or proven to be reliable). Additionally or alternatively, identification module 104 may identify users who are not overburdened with requests to review files. For example, identification module 104 may identify users who have not exceeded a certain quota of reviews (e.g., five reviews in the past month, 20 reviews in total, etc.). Moreover, identification module 104 may identify users based on a recommendation or request from the user of computing device 202 (e.g., the user of computing device 202 may specify one or more users that should review file 208).

Furthermore, in some embodiments, identification module 104 may identify a certain number (e.g., 10 or 25) or a certain percentage (e.g., 5% or 10%) of computing devices or users. For example, identification module 104 may identify at least a certain number of computing devices within computing devices 206(1)-(N) that are potentially associated with file 208 in order to ensure a comprehensive assessment of file 208. Identification module 104 may identify the multiple computing devices (or users of the multiple computing devices) using any one or combination of the techniques described above and/or any additional identification technique.

Figure 4:
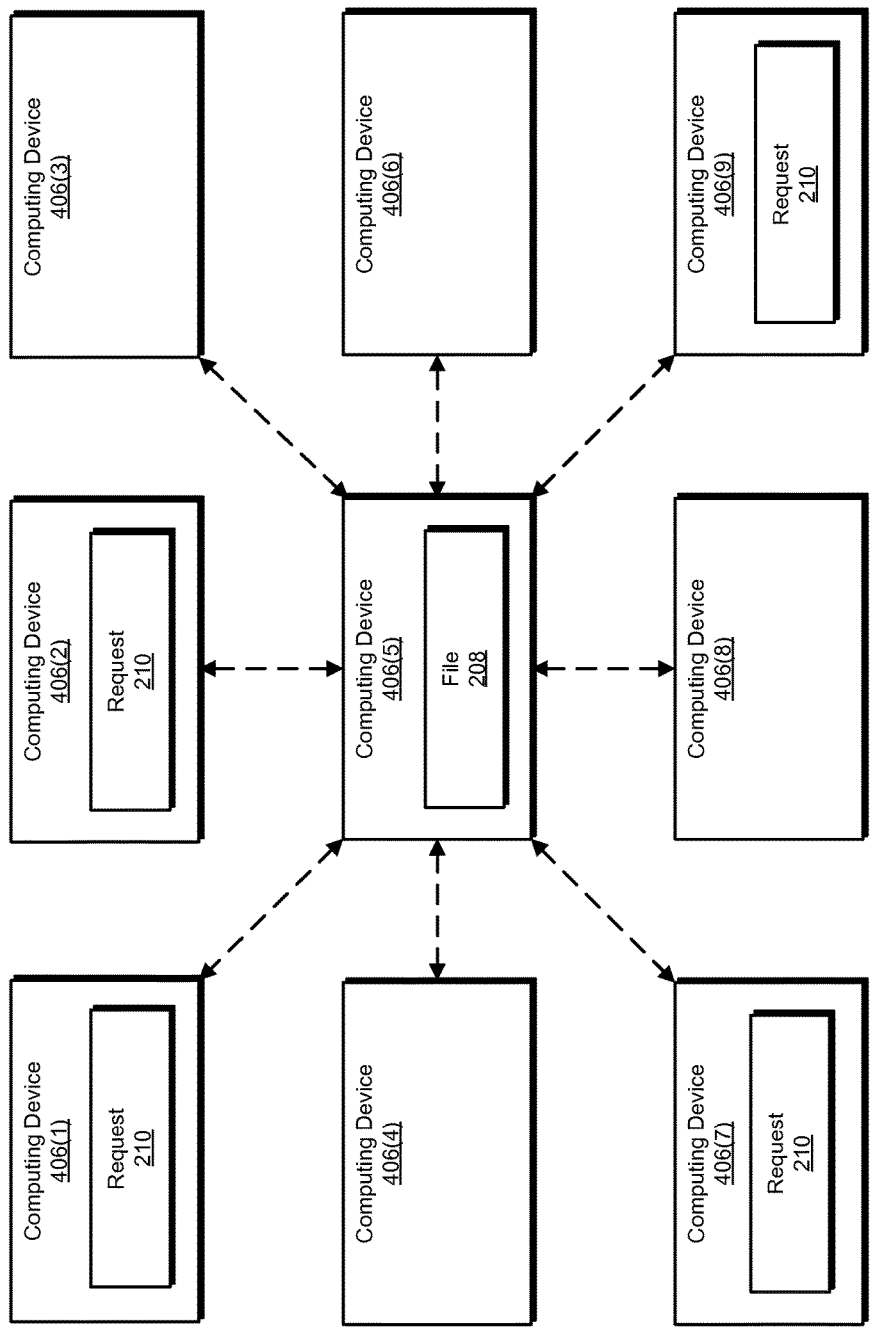
FIG. 4 is an illustration of exemplary computing devices managed by an organization.

As an example, FIG. 4 illustrates multiple computing devices managed by an organization. In this example, computing devices 406(1)-(9) may represent individual computing devices of members of a single organization. In one example, identification module 104 may identify file 208 on computing device 406(5). In response, identification module 104 may analyze properties of computing device 406(5), properties of the user of computing device 406(5), and/or properties of the remaining users and computing devices within the organization to identify one or more computing devices that may be potentially associated with file 208. In the example of FIG. 4, identification module 104 may determine that four computing devices (i.e., computing devices 406(1), 406(2), 406(7), and 406(9)) are potentially associated with file 208.

Returning to FIG. 3, at step 306 one or more of the systems described herein may distribute at least a portion of the file to a user of the additional computing device with a request to receive an indication of the trustworthiness of the file. For example, distribution module 106 may, as part of computing device 202 in FIG. 2, distribute at least a portion of file 208 with request 210 to at least one of computing devices 206(1)-(N).

The systems described herein may distribute a request for an indication of the trustworthiness of a file in a variety of ways. In some examples, distribution module 106 may distribute a copy of request 210 to each previously-identified computing device that may potentially be associated with file 208. For example, distribution module 106 may distribute request 210 by emailing request 210 to messaging accounts managed by users of the identified computing devices or posting request 210 on an online forum accessible to the users of the identified computing devices. Furthermore, in some embodiments, distribution module 106 may distribute request 210 to each identified computing device before computing device 202 is allowed to access (e.g., install, download, or execute) file 208.

Referring to the example of FIG. 4, distribution module 106 may distribute a copy of request 210 to each relevant computing device identified within computing devices 406(1)-(9). As shown in FIG. 4, computing devices 406(1), 406(2), 406(7), and 406(9) may each receive a copy of request 210.

In some examples, request 210 may contain all or a portion of the content of file 208 (or a link that provides access to file 208). Additionally or alternatively, request 210 may contain information associated with file 208 but not stored within file 208. For example, request 210 may contain information about the context of file 208 within the organization that manages computing device 202. Specifically, request 210 may indicate which computing devices and/or how many computing devices within the organization have attempted to access file 208. In another example, request 210 may include information about the source of file 208, such as a software distributor that created file 208, a compiler or other program used to generate file 208, and/or websites that host file 208. In a further example, request 210 may include information about behaviors exhibited by file 208 and/or permissions requested by file 208. In general, request 210 may contain any information relevant to file 208 that may enable a reviewer to accurately and/or efficiently determine the trustworthiness of file 208.

Distribution module 106 may prompt reviewers (via request 210) to determine the trustworthiness of file 208 in a variety of ways. In some examples, distribution module 106 may direct reviewers to perform a malware scan or similar analysis on file 208. Additionally or alternatively, distribution module 106 may direct reviewers to run or execute file 208 to identify any unusual, suspicious, or malicious behaviors exhibited by file 208. In some embodiments, the systems described herein may provide computing device 202 and/or computing devices 206(1)-(N) with a virtual execution environment in which to analyze file 208. The term "virtual execution environment," as used herein, generally refers to any type or form of execution space that may be separated or partitioned from another execution space. Distribution module 106 may provide users of computing device 202 and computing devices 206(1)-(N) with a virtual execution environment in any suitable manner, such as by partitioning a portion of the hard drives of each computing device or by hosting virtual machines accessible to the computing devices. In this way, the systems described herein may enable reviewers to thoroughly examine all potentially negative consequences of executing incoming files while not allowing the files to infect, corrupt or otherwise harm their own computing devices.

In addition, distribution module 106 may direct users to provide their assessment of the trustworthiness of file 208 in a variety of ways. In some examples, distribution module 106 may simply direct users to indicate whether their assessment of file 208 is positive (e.g., "trustworthy" or "good") or negative (e.g., "untrustworthy" or "bad"). In other examples, distribution module 106 may prompt reviewers to indicate the trustworthiness of file 208 within a range or scale. For example, distribution module 106 may direct reviewers to select a number between 1-10, with 10 corresponding to a strong indication of trustworthiness.

Furthermore, in some embodiments, distribution module 106 may prompt reviewers to provide information in addition to an indication of the trustworthiness of file 208. For example, distribution module 106 may include, within request 210, a request for a reviewer to indicate one or more permissions that should be granted to file 208 when file 208 is executed by computing device 202 and/or computing devices 206(1)-(N). In one example, distribution module 106 may direct a reviewer to list or select any permissions (e.g., permission to connect to other devices via a certain network, permission to install drivers, permission to inject threads, permission to launch other processes, etc.) that are required by file 208 and/or that will not enable file 208 to perform any malicious behaviors. In addition, distribution module 106 may prompt a reviewer to indicate any restrictions that should be imposed on the behavior of file 208, such as restrictions on networks file 208 can access and/or restrictions on the amount of data uploaded or downloaded by file 208.

Additionally or alternatively, distribution module 106 may prompt reviewers to provide a justification of the indication of the trustworthiness of file 208. Specifically, distribution module 106 may direct a reviewer to generate a short written explanation of the reasons why a certain indication of trustworthiness was chosen (e.g., based on behaviors exhibited by file 208 when analyzing file 208). As will be explained in greater detail below, justifications of indications of trustworthiness may be used to determine whether a reviewer is a trusted reviewer. Additionally or alternatively, justifications may be used by other reviewers to confirm or enhance their own assessments of files.

As an example, FIG. 5 illustrates a portion of the information that may be included within request 210. In this example, request 210 may indicate that a file with a filename of "File1.exe" was identified on the computing device of a user known as "User1." Furthermore, request 210 may prompt the receiver of request 210 to analyze File1.exe using a virtual execution environment. Request 210 may include any additional information, such as information about the source of File1.exe and/or the prevalence of File1.exe within an organization to which User1 belongs.

Returning to FIG. 3, at step 308 one or more of the systems described herein may receive, from the additional computing device, a response that indicates the trustworthiness of the file. For example, reception module 108 may, as part of computing device 202 in FIG. 2, receive, from at least one of computing devices 206(1)-(N), response 212 that indicates the trustworthiness of file 208.

The systems described herein may receive a response that indicates the trustworthiness of a file in a variety of ways. In some examples, reception module 108 may receive response 212 in an email or other electronic message (e.g., in the event that distribution module 106 distributed request 210 via an electronic message). In other examples, reception module 108 may identify response 212 on an online forum configured to display responses from members of the organization that manages computing device 202.

In some embodiments, the systems described herein may determine whether file 208 is trustworthy or untrustworthy based on response 212 and/or additional responses from additional reviewers. The term "untrusted file," as used herein, generally refers to any type or form of file that may compromise the integrity and/or security of a computing device. In some examples, a file may be untrusted if it has an unverified and/or malicious source. Additionally or alternatively, an untrusted file may exhibit any suspicious or malicious behaviors. In contrast, the term "trusted file," as used herein, generally refers to any type or form of file that is known or presumed to be benign, legitimate, and/or useful to the operation of a computing device.

In one example, security module 110 may determine that file 208 is trustworthy in the event that each polled member within the organization indicates that file 208 is trustworthy (or is trustworthy above a certain threshold, such as being assigned a trustworthiness value of "8" on a scale of 1-10). Conversely, security module 110 may determine that file 208 is untrustworthy in the event that one or more polled members within the organization indicate that file 208 is untrustworthy (or is trustworthy below a certain threshold). In other examples, security module 110 may determine whether file 208 is trustworthy based at least in part on justifications of the indications of trustworthiness. For example, security module 110 may determine that file 208 is trustworthy in the event that one or more responses from reviewers contain justifications such as "file 208 does not exhibit any suspicious behaviors" or "file 208 is a necessary work-related file."

As an example, FIG. 5 illustrates a portion of the information that may be included within response 212. As shown in FIG. 5, response 212 may indicate that the File1.exe is trustworthy. In addition, response 212 may justify the indication that File1.exe is trustworthy by stating that File1.exe does not exhibit any unusual or suspicious behaviors. Furthermore, response 212 may indicate that when executed, File1.exe should be granted permissions to install drivers, launch processes, and access networks.

The systems described herein may perform a variety of actions based on the determination of the trustworthiness of file 208. In the event that security module 110 determines that file 208 is trustworthy, security module 110 may allow computing device 202 to access (e.g., download, install, and/or execute) file 208. Furthermore, in some examples, security module 110 may allow one or more of computing devices 206(1)-(N) to access file 208 in response to the determination that file 208 is trustworthy. For example, security module 110 may add file 208 to a whitelist that identifies files allowed to be accessed by computing device 202 and/or computing devices 206(1)-(N). The whitelist may be maintained on each computing device within the organization and/or on a central server that monitors files accessed by computing devices within the organization. When a user of a computing device within the organization attempts to access an instance of file 208, the systems described herein may identify file 208 on the whitelist and automatically enable the user to access the file.

Notably, in some examples, security module 110 may restrict the operation of file 208 on computing devices within the organization based on the allowed permissions identified by reviewers within the organization. For example, security module 110 may prevent file 208 from being granted permissions other than the allowed permissions when file 208 is executed by computing device 202 and/or computing devices 206(1)-(N).

In the event that security module 110 determines that file 208 is untrustworthy, security module 110 may prevent computing device 202 from accessing file 208. In addition, in some examples, security module 110 may prevent other computing devices within the organization from accessing file 208 by adding file 208 to a blacklist that identifies files not allowed to be accessed by computing device 202 and/or computing devices 206(1)-(N). In some embodiments, after creating a whitelist and/or blacklist of allowed or denied files, the systems described herein may export the whitelist and/or blacklist to other entities or organizations. As such, the systems described herein may help determine or establish the global reputation of one or more files (instead of just the reputations of files only within an organization).

In some examples, security module 110 may alert an administrator within the organization in response to the determination about the trustworthiness of file 208. For example, security module 110 may notify an administrator that a new file has been determined to be trustworthy or untrustworthy and/or which computing devices within the organization have accessed file 208. In another example, security module 110 may provide an update to an administrator that file 208 has been added to a whitelist or a blacklist. While the systems described herein may eliminate or reduce the need of an administrator within an organization to manually approve or block files within the organization, an administrator may still be notified of additions to a whitelist and/or maintain control over files added to the whitelist.

As previously mentioned, the systems described herein may determine whether a user is a trusted reviewer. The term "trusted reviewer," as used herein, generally refers to any member of an organization whose judgement about the trustworthiness of files is presumed or proven to be reliable. In some examples, a reviewer may be deemed trusted based on the reviewer's history of determining the trustworthiness of files identified within an organization. For example, a reviewer may be labelled as trusted in the event that a certain number or percentage of a reviewer's decisions regarding previous files have been proven to be accurate (e.g., based on subsequent malware scans of the files and/or the assessments of other reviewers). In other examples, a reviewer may be labelled as trusted based on the reviewer holding a certain position within an organization (e.g., a manager or IT administrator).

Additionally or alternatively, a reviewer may be labelled as trusted based on one or more justifications about the trustworthiness of files provided by the reviewer. For example, reception module 108 may display justifications from a reviewer on an online forum accessible to users within an organization. Users may then evaluate the justifications and indicate whether the justifications are trusted, informative, well-written, etc. In one example, users may provide a positive assessment of the justification (e.g., an "upvote" or "like)" or a negative assessment of the justification (e.g., a "downvote" or "dislike"). The systems described herein may then identify trusted reviewers by identifying reviewers who have received at least a certain number of positive assessments or certain percentage of positive assessments (e.g., compared to negative assessments).

In some embodiments, the systems described herein may provide one or more rewards to trusted reviewers. For example, reward module 112 may offer incentives to users within an organization in order to encourage the users to accurately review files, review greater numbers of files, and/or provide helpful justifications about decisions made concerning the trustworthiness of files. Trusted reviewers may receive any type or form of reward or incentive. In an exemplary embodiment, reward module 112 may reward trusted reviewers by giving trusted reviewers the privilege to access files before the files have been analyzed and found to be trustworthy by other users. For example, reward module 112 may enable trusted reviewers to decide for themselves whether a file is trustworthy or untrustworthy and then access the file according to their decision.

As explained above, a computing device within an organization may identify a file that a user is attempting to access on the computing device. In response to identifying the file, the computing device may identify one or more additional users and/or computing devices within the organization that may be potentially associated with the file. For example, the computing device may identify computing devices that have a similar configuration to the computing device that attempted to access the file and/or computing devices of users who are known to be trusted reviewers of files. The computing device may then distribute the file to the additional computing devices with a request to analyze the file to determine the trustworthiness of the file. Based on the responses from the additional computing devices, the computing device may allow the file within the organization (in the event that the file is determined to be trustworthy) or block the file within the organization (in the event that the file is determined to be untrustworthy).

Figure 6:
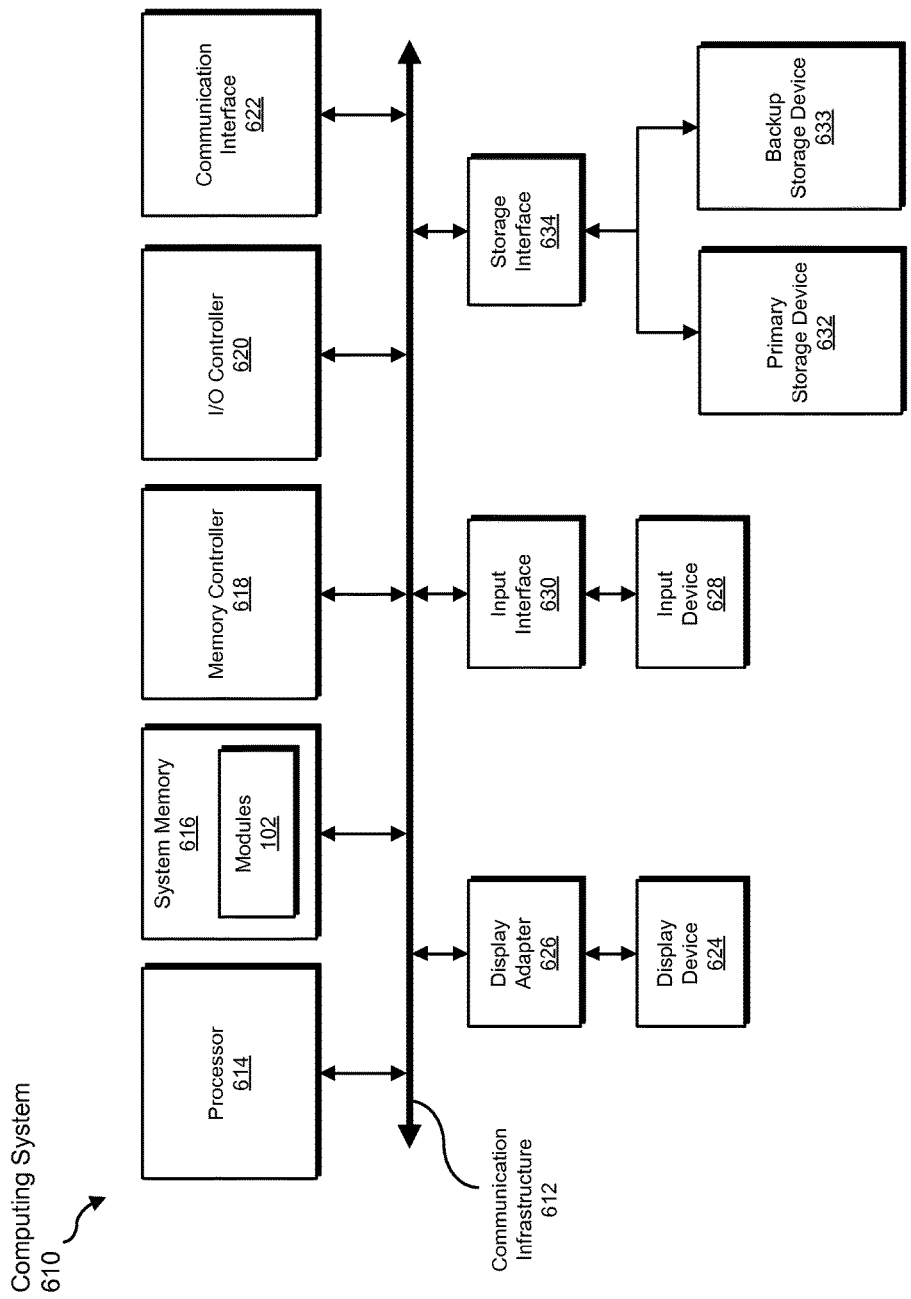
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
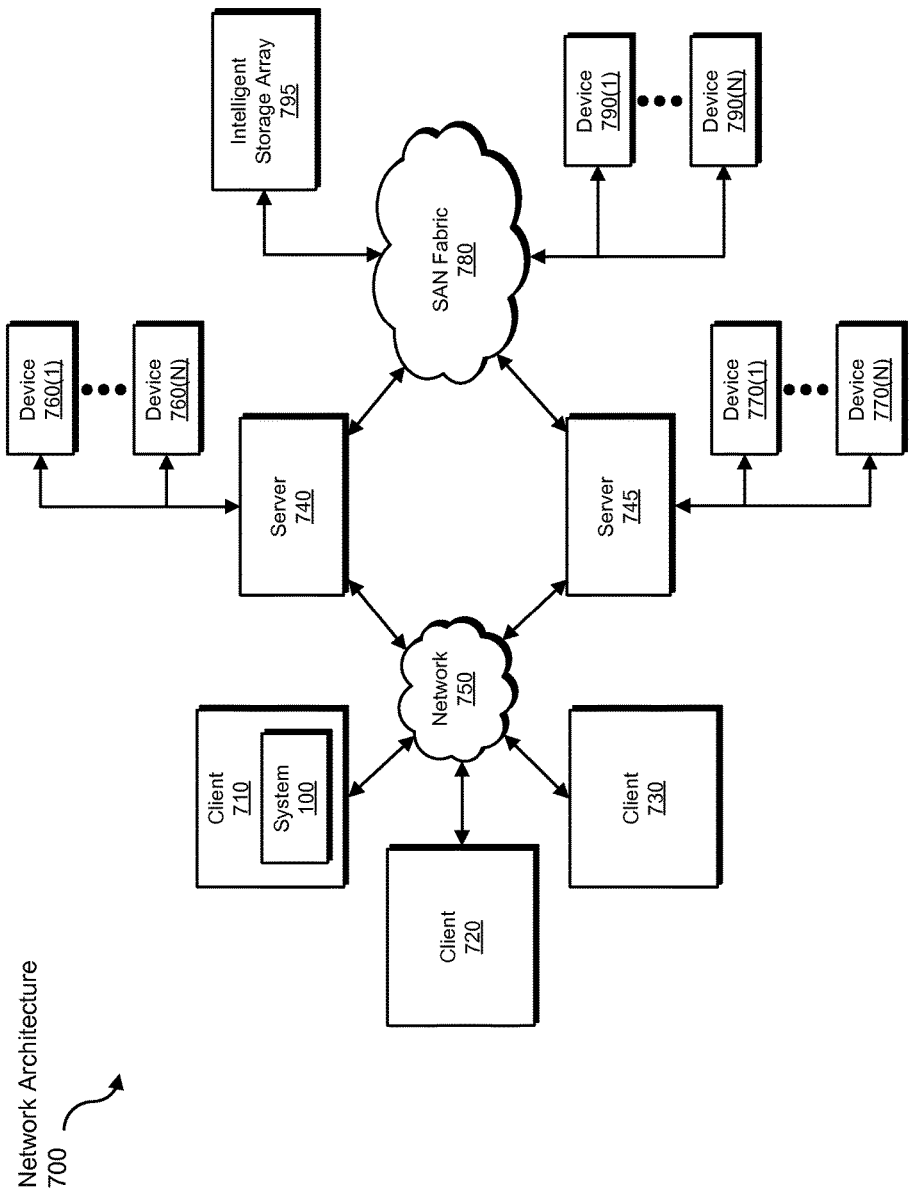
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining the trustworthiness of files within organizations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file into an indication of the trustworthiness of the file, output a result of the transformation to a user that attempted to access the file, use the result of the transformation to block or allow the attempt to access the file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining trustworthiness of files within organizations, at least a portion of the method being performed by a computing device comprising at least one processor, the method comprising:
    identifying a file on a computing device within a plurality of computing devices managed by an organization;
    before allowing the computing device to access the file:
        identifying a user of an additional computing device within the plurality of computing devices that is qualified to assess the trustworthiness of the file based on determining that the user has previously assessed additional files that share characteristics with the file;
        distributing at least a portion of the file to the user of the additional computing device with a request to receive an indication of the trustworthiness of the file; and
        receiving, from the additional computing device, a response that indicates the trustworthiness of the file based on at least the portion of the file that was distributed to the user of the additional computing device;
    protecting a security state of the computing device by controlling the computing device's access to the file based on the trustworthiness of the file indicated in the response;
    determining, based at least in part on an analysis of the response received from the additional computing device, that the user of the additional computing device is a trusted reviewer that is capable of accurately identifying security threats within the organization; and
    in response to determining that the user of the additional computing device is the trusted reviewer, rewarding the user by enabling the additional computing device to access other files before the other files have been assessed for trustworthiness by other users within the organization.

2. The method of claim 1, wherein identifying the file on the computing device comprises detecting at least one attempt by a user of the computing device to:
    install the file on the computing device;
    download the file onto the computing device; and
    execute the file on the computing device.

3. The method of claim 1, wherein identifying the user that is qualified to assess the trustworthiness of the file is further based on determining that the qualified user and a user of the computing device on which the file was identified have similar roles within the organization.

4. The method of claim 1, wherein distributing the portion of the file to the user of the additional computing device comprises distributing at least one of:
    information about a source of the file; and
    information about behaviors exhibited by the file.

5. The method of claim 1, further comprising providing, to the user of the additional computing device, a virtual execution environment in which to analyze the file.

6. The method of claim 1, wherein determining that the user of the additional computing device is the trusted reviewer comprises:
    receiving, from the user of the additional computing device, a justification of the indication of the trustworthiness of the file;
    displaying the justification of the indication of the trustworthiness of the file to a plurality of users within the organization; and
    determining that at least a predetermined number of users within the organization indicate that the justification is trusted.

7. The method of claim 1, wherein determining that the user of the additional computing device is the trusted reviewer comprises determining that the user of the additional computing device has correctly indicated the trustworthiness of at least a predetermined number of files identified on computing devices within the plurality of computing devices.

8. The method of claim 1, further comprising:
distributing, to the user of the additional computing device, a request to identify permissions that should be granted to the file when the file is executed by the plurality of computing devices;
receiving, from the additional computing device, at least one allowed permission in response to the request; and
preventing the file from being granted permissions other than the allowed permission when the file is executed by the plurality of computing devices.

9. The method of claim 1, wherein controlling the computing device's access to the file based on the trustworthiness of the file comprises:
determining that the response from the additional computing device indicates that the file is trustworthy; and
based on the response from the additional computing device indicating that the file is trustworthy, adding the file to a whitelist that identifies files allowed to be accessed by the plurality of computing devices.

10. The method of claim 1, wherein controlling the computing device's access to the file based on the trustworthiness of the file comprises:
determining that the response from the additional computing device indicates that the file is untrustworthy; and
based on the response from the additional computing device indicating that the file is untrustworthy, adding the file to a blacklist that identifies files not allowed to be accessed by the plurality of computing devices.

11. A system for determining trustworthiness of files within organizations, the system comprising:
a memory;
a physical processor coupled to the memory;
an identification module, stored in the memory, that:
identifies a file on a computing device within a plurality of computing devices managed by an organization; and
before the computing device is allowed to access the file, identifies a user of an additional computing device within the plurality of computing devices that is qualified to assess the trustworthiness of the file based on determining that the user has previously assessed additional files that share characteristics with the file;
a distribution module, stored in the memory, that distributes at least a portion of the file to the user of the additional computing device with a request to receive an indication of the trustworthiness of the file;
a reception module, stored in the memory, that receives, from the additional computing device, a response that indicates the trustworthiness of the file based on at least the portion of the file that was distributed to the user of the additional computing device;
a security module, stored in the memory, that protects a security state of the computing device by controlling the computing device's access to the file based on the trustworthiness of the file indicated in the response;
a reward module, stored in memory, that:
determines, based at least in part on an analysis of the response received from the additional computing device, that the user of the additional computing device is a trusted reviewer that is capable of accurately identifying security threats within the organization; and
in response to determining that the user of the additional computing device is the trusted reviewer, rewards the user by enabling the additional computing device to access other files before the other files have been assessed for trustworthiness by other users within the organization; and
wherein the physical processor is configured to execute the identification module, the distribution module, the reception module, the security module, and the reward module.

12. The system of claim 11, wherein the identification module identifies the user that is qualified to assess the trustworthiness of the file further based on determining that the qualified user and a user of the computing device on which the file was identified have similar roles within the organization.

13. The system of claim 11, wherein the distribution module distributes the portion of the file to the user of the additional computing device by distributing at least one of:
information about a source of the file; and
information about behaviors exhibited by the file.

14. The system of claim 11, wherein the distribution module further provides, to the user of the additional computing device, a virtual execution environment in which to analyze the file.

15. The system of claim 11, wherein the security module controls the computing device's access to the file based on the trustworthiness of the file by:
determining that the response from the additional computing device indicates that the file is trustworthy; and
based on the response from the additional computing device indicating that the file is trustworthy, adding the file to a whitelist that identifies files allowed to be accessed by the plurality of computing devices.

16. The system of claim 11, wherein the security module controls the computing device's access to the file based on the trustworthiness of the file by:
determining that the response from the additional computing device indicates that the file is untrustworthy; and
based on the response from the additional computing device indicating that the file is untrustworthy, adding the file to a blacklist that identifies files not allowed to be accessed by the plurality of computing devices.

17. A non-transitory computer-readable medium comprising one or more computer-executable instructions that, when executed by a computing device comprising at least one processor, cause the computing device to:
identify a file on a computing device within a plurality of computing devices managed by an organization;
before allowing the computing device to access the file:
identify a user of an additional computing device within the plurality of computing devices that is qualified to assess the trustworthiness of the file based on determining that the user has previously assessed additional files that share characteristics with the file;
distribute at least a portion of the file to the user of the additional computing device with a request to receive an indication of the trustworthiness of the file; and
receive, from the additional computing device, a response that indicates the trustworthiness of the file based on at least the portion of the file that was distributed to the user of the additional computing device;
protect a security state of the computing device by controlling the computing device's access to the file based on the trustworthiness of the file indicated in the response;

determine, based at least in part on an analysis of the response received from the additional computing device, that the user of the additional computing device is a trusted reviewer that is capable of accurately identifying security threats within the organization; and in response to determining that the user of the additional computing device is the trusted reviewer, reward the user by enabling the additional computing device to access other files before the other files have been assessed for trustworthiness by other users within the organization.

18. The method of claim 1, wherein determining that the user of the additional computing device is the trusted reviewer is further based on a role of the user within the organization.

19. The method of claim 1, wherein identifying the user that is qualified to assess the trustworthiness of the file is further based on determining that the user has previously been identified as the trusted reviewer.

20. The method of claim 1, wherein identifying the user that is qualified to assess the trustworthiness of the file is further based on determining that the number of files that the user has previously reviewed does not exceed a certain number.

* * * * *